July 26, 1960   D. METTETAL, JR   2,946,328
LUBRICATING APPARATUS
Filed Aug. 13, 1957
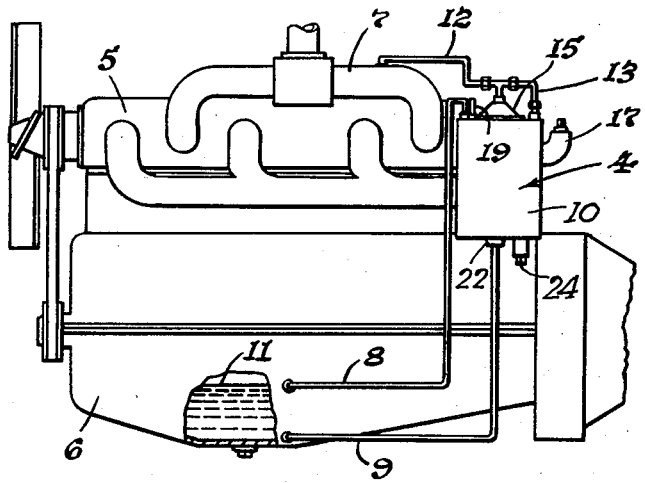
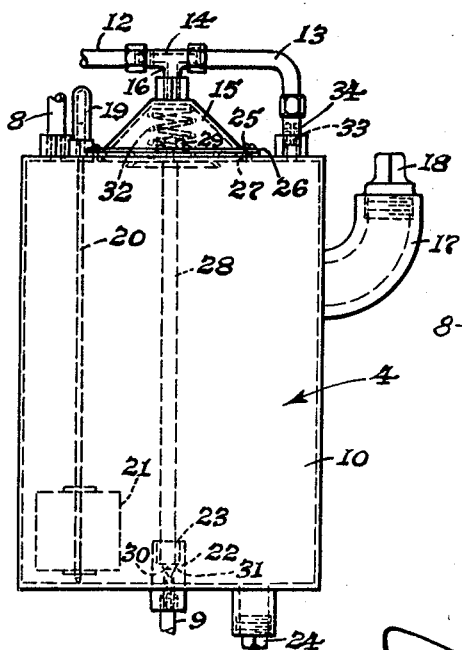
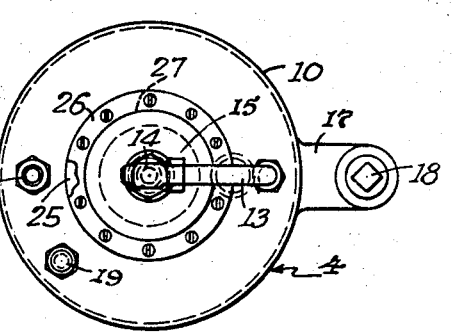
Inventor
Don Mettetal, Jr.
Atty

2,946,328

LUBRICATING APPARATUS

Donald Mettetal, Jr., Wauconda, Ill., assignor to Orofino Berry Anderson, Rockford, Ill.

Filed Aug. 13, 1957, Ser. No. 677,888

1 Claim. (Cl. 123—196)

This invention relates to apparatus for maintaining a constant correct level of lubricating oil in the crank case of an internal combustion engine, and is more particularly concerned with improvements in apparatus of that kind disclosed in Berry Patent No. 2,615,442, issued October 28, 1952.

The principal object is to provide such an apparatus, all assembled neatly and most economically in one tank, which may be quickly and easily applied to the engine of a truck, tractor, bulldozer, or the like, wherever it is important that an engine have the correct level of lubricating oil maintained, a unit so constructed being advantageous also from the standpoint that all components are enclosed and thereby protected against tampering and accidental damage.

The invention is illustrated in the accompanying drawing, in which—

Fig. 1 is a side elevation of an internal combustion engine showing a unit made in accordance with the present invention applied thereto;

Fig. 2 is a side view of the unit itself shown on a larger scale and indicating in dotted lines the construction thereof, and Fig. 3 is a top view of Fig. 2.

The same reference numerals are applied to corresponding parts in these three views.

Referring to the drawing, the reference numeral 4 designates the unit of my invention which may conveniently be supported on the dash adjacent the upper part of the associated internal combustion engine 5, above the level of the crank case 6 and preferably near the intake manifold 7. 8 indicates a tube connected with the crank case 6 on one side thereof at a predetermined elevation above the connection of another tube 9, the tube 9 extending to the bottom of the oil reservoir tank 10 and tube 8 extending to the top thereof with a view to maintaining the level of oil in the crank case, as shown at 11, at the level where pipe 8 communicates with crank case 6, as hereinafter described. 12 is a tube extending from the top of tank 10 and connected to the intake manifold 7, whereby, so long as engine 5 runs, to maintain the tank 10 under suction through the one branch connection 13 from the T-fitting 14 and at the same time maintain a diaphragm chamber 15 under suction through the leg 16 of the fitting. The tank 10 is chosen as to size according to the size of the engine and has a capacity usually of about six quarts when filled to the level of the top of the filler neck 17. A plug 18 closes the open end of the filler neck. A sight gauge 19 is provided on the top of the tank 10 and, so long as there is any oil in the tank, the upper end of the rod 20 indicates that by its up position in the gauge, this rod having on its lower end a cork float 21 to keep the rod elevated in gauge 19 until there is no longer enough oil left in the tank. The outlet fitting 22 in the bottom of tank 10 traps a certain small amount of oil in the tank, the elevation of the opening 23 thereby enabling catching dirt particles and fine metallic particles, which settle out from the oil and form a sludge in the bottom of the tank that can be cleaned out to advantage from time to time after removal of a drain plug 24.

A flexible diaphragm 25 is clamped around its marginal edge portion between a flange 26 on the cap defining the suction chamber 15 and the top wall of the tank around a central opening for a diaphragm 27 provided therein, and this diaphragm has the upper end of a valve stem 28 secured to the center thereof, as indicated at 29, the lower end of the valve stem being conically pointed, as indicated at 30, and arranged to engage a valve seat 31 in the fitting 22 to control the flow of oil from tank 10 by gravity to crank case 6. A coiled compression spring 32 caged between the upper end of the cap 15 and the diaphragm 27 tends normally to urge the valve stem 28 downwardly to engage the seat 31.

In operation, with the engine 5 running and with tank 10 containing oil up to or slightly below the level of the filler neck 17, if the level of oil in the crank case 6 drops below the normal level indicated at 11, the suction in tank 10 is relieved by the air delivered through tube 8 through the uncovered lower end thereof, and, inasmuch as the restricted opening 33 in the fitting 34 is so proportioned in relation to the size of tube 8 that more air can enter tank 10 through tube 8 than the engine suction can take away, the valve 28 is held open by suction from the engine intake manifold 7 and oil flows through tube 9 by gravity to the crank case 6 to raise the level to the point where the air inlet to tube 8 is shut off, whereupon the reduction in pressure on opposite sides of the diaphragm 25 is equalized and spring 32 closes the valve 28. Obviously, oil will be drawn out through tube 8 to tank 10 only so long as the oil level in the crank case 6 is above the inlet end of tube 8; hence, this makes for fine control of the oil level, and, inasmuch as it is always the hottest oil from the upper level in the crank case that is drawn off through tube 8, the tank 10 performs incidentally a cooling function in addition to its main function of a reservoir for the maintenance of a predetermined level of oil in the crank case. The other incidental function that is likewise important has already been mentioned, namely, that of catching foreign particles of dirt and metal, which may be cleaned out from time to time by removal of drain plug 24 from the bottom of tank 10. A glance from time to time at the sight gauge 19 to check the position of rod 20 is enough to indicate to the operator whether oil should be added to tank 10 in order to keep the unit 4 functioning as intended. All components of this unit are enclosed and thereby protected against tampering and accidental damage, so that the manufacturer is safer in guaranteeing its good performance indefinitely than he might be otherwise.

It is believed the foregoing description conveys a good understanding of the objects and advantages of my invention. The appended claim has been drawn to cover all legitimate modifications and adaptations.

I claim:

In a device for supplying lubricating oil to the crankcase of an internal combustion engine having a suction manifold whenever the level of the oil in the crankcase subsides below a predetermined level while the engine is running, a closed oil reservoir supported above the crankcase, a gravity feed pipe leading downwardly from an opening in the bottom of the reservoir into the crankcase, said feed pipe having an open lower end located near the bottom of the crankcase, an air pipe leading upwardly from the crankcase to an opening in the top of said reservoir above the level of oil therein, said air pipe having an open lower end located in the crankcase at a level intermediate the bottom of the crankcase and the normal level of oil in the crankcase, a suction pipe having an end adapted to be connected with the engine intake manifold and having another end connected with a restricted opening in the top of said oil reservoir above the level of oil therein, the improvement which consists in providing the closed oil reservoir with another opening in the top thereof independent of the openings for the air pipe and suction pipe, a flexible diaphragm closing said last named opening, a cap fixed with said diaphragm to the top of said reservoir defining a suction chamber therein having relatively unrestricted communication with the suction pipe, a vertical valve stem inside the reservoir connected at its upper end to the diaphragm and having a tapered lower end arranged to close the opening in the bottom of the reservoir communicating with the gravity feed pipe, and a coiled compression spring caged in said cap normally urging the diaphragm and valve stem downwardly to closed position.

References Cited in the file of this patent

UNITED STATES PATENTS

| | | |
|---|---|---|
| 1,163,919 | Herb | Dec. 14, 1915 |
| 1,464,060 | Crisenberry | Aug. 7, 1923 |
| 1,558,597 | Eckard | Oct. 27, 1925 |
| 2,615,442 | Berry | Oct. 28, 1952 |
| 2,650,611 | Henderson | Sept. 1, 1953 |